3,520,713
SELF-REGENERATIVE CARBOGRAPHIC ARTICLES AND PROCEDURE FOR PRODUCING THEM
Sergio Sala and Ambrogio Cuneo, both of
Via Durini 7, Milan, Italy
No Drawing. Filed May 22, 1967, Ser. No. 640,392
Claims priority, application Italy, May 25, 1966,
18,265; Mar. 17, 1967, 13,840/67
Int. Cl. B41m 5/10
U.S. Cl. 117—36.4    5 Claims

ABSTRACT OF THE DISCLOSURE

Self-regenerative carbographic articles comprising a support film and adhered thereto a spongy layer comprising one or more cellulose esters, a plasticizer for said ester, a liquid wax vehicle for the dyestuffs and/or pigments, insoluble in and uncompatible with the cellulose ester, and dyestuffs and/or pigments.

---

The present invention relates to self-regenerative carbographic articles such as carbon paper, tracing paper, typewriter ribbons and similar articles by means of which any mark can be transferred onto a suitably placed surface apt to receive it under the pressure exerted by the key of a typewriter, a pen, a pencil, etc.

The carbographic articles at present in commerce are essentially of three types:

(a) The first type are articles consisting of a support which can be a sheet of paper, a film of synthetic material or silk, cotton or nylon, ribbon on which ink essentially consisting of solid waxes, oils, dyes and/or pigments is applied. This type of ink has the disadvantage of softening when subjected to hot climate temperatures thus making the sheet adhesive and apt to stain so that the writing becomes inadequate and the article soon becomes unusable. Moreover, it is impossible to spread a layer of ink over one side of the support without spreading a layer of compensating solid wax or resin on the other side in order to bring about the static compensation apt to guarantee the flatness of the sheet. This makes for products of considerable thickness and, consequently, of poor sensitivity.

Finally, wax based inks have the disadvantage of being transferred wholly or to a considerable degree under the effect of the pressure exerted on the sheet of paper or any other material on which the writing or the mark is to be traced, with the result that the carbographic article has but a short period of usefulness.

(b) The second type are articles analogous to those above described where, however, where the inks contain synthetic polymers as a binding agent instead of solid waxes. These articles, though an improvement as compared with wax based inks, especially as to adhesiveness when applied in hot climates, and resistance to curling, still have the bad feature of relatively short life.

(c) The third type are self-regenerative carbographic articles essentially as described in the Italian Pat. No. 622,835, characterized by the fact that the ink consists of (1) a synthetic polymer (in practice, a vinyl polymer) which under suitable conditions can assume a cellular structure, (2) an oil having the twofold function of plasticizer for the polymer and of vehicle for the dyes and/or pigments, and (3) the dyes and pigments themselves.

This type of carbographic article marked a decisive advance in this area since the layer of cellular synthetic material linked to the support forms a minute sponge in the cells of which the other components of the ink are held.

After the manual or mechanical pressure has transferred the ink onto the receiving surface, ink from the neighbouring cells passes into the exhausted ones thus after a certain lapse of time, producing tracing paper, carbon paper, typewriter ribbon, etc. repeatedly efficient for a certain number of strokes at any point of its surface. The life of these articles is thus considerably enhanced.

We now found a new self-regenerative pressure copying element differing from those known to date and having a much longer period of utility. This new element forms the subject of the present invention.

The copying element forming the subject of the present invention chiefly consists of a support and of a coating and image transfer composition comprising (1) at least one simple ester or mixed ester of cellulose, capable of affording under suitable conditions a cellular layer linked to the support, (2) an oil having a plasticing effect on the cellulose ester, (3) a substance totally or, at least, predominantly insoluble in and not miscible with the cellulose ester which only acts as a vehicle of the dyes and/or pigments, and (4) dyestuffs and/or pigments.

The support may consist of sheets, ribbons or the like such as paper, artificial polymers or synthetic polymers such as polyesters, nylon, polyvinyl chloride, polyvinylidene chloride, polypropylene, polyethylene etc. Preference is given to films of high strength synthetic polymers. Since these are long lasting articles and reuseable many times, it is imperative that the support should also have an adequate mechanical strength.

The simple or mixed esters of cellulose capable, under suitable conditions, of forming a cellular layer adhering to the support are: butyrate, propionate, propionate acetate, butyrate acetate, cellulose propionate butyrate acetate, etc.

Among the esters listed above, the mixed ones are to be preferred as yielding a spongy cellular layer with properties better suited to the objective of the present invention. In fact, the way the said cellular layer is formed is fundamental to effect the invention since, if a sponge with closed non-communicating cells should build up, or one with cells of insufficient volume or rather with cells not proportional to the viscosity of the coloured liquid, the mechanism of compensation through passage to the exhausted cells from those still full, could not work. On the other hand, a sponge having cells too wide open would allow the ink, i.e. the vehicle and the dyes to transude, with all the undesirable effects easily descernible to any technician expert in the art.

What we found as to the possibility of forming a cellular layer with cellulose esters is particularly unexpected in view of the fact that such esters are not included in the materials commonly used for forming spongy materials. Their traditional application in fact is for making lacquers, paints and protective films.

It must also be stressed that, if one prepares coating and transfer compositions for self-regenerative carbographic articles of the type named above under (c) replacing the vinyl polymers by cellulose esters, i.e. compositions comprising one cellulose ester, one mineral, vegetable or animal oil, one solvent, and one dyestuff, one obtains an article of inferior quality which certainly does not mark a progress over the poorest qualities in the market.

The present invention has been made possible by the discovery that for the formation of cellulose ester sponge, it is vital to work in the presence of the exact quantity of plasticizer. It has been found that in order to obtain a self-regenerative reproducer layer, it is necessary to dissociate the two functions of plasticizing and of serving as a vehicle for the dyestuff so as to make it possible to use the optimum quantity of each of the said components. In practice, it has proved extremely difficult to find a vehicle not having any plasticizing effect on the cellulose ester but whose solubility and miscibility with regard to them are nil or practically negligible.

We found the substances meeting these requirements to be the liquid waxes.

By this term, a well defined group of substances is designated the outward aspects of which are similar to that of the liquid fats but which differ from them as to the following properties:

(a) They have a specific weight ranging from .875 to .885.

(b) Their viscosity ranges from 5.6 to 7.1° Engler at 20° C.

(c) They show a totally different behaviour at an increase of temperature, their viscosity remaining nearly unchanged whilst that of the fatty oils varies considerably according to temperature, rapidly decreasing as temperature rises.

Liquid waxes are for the most part composed of esters of unsaturated fatty acids and monovalent unsaturated alcohols of the $C_nH_{2n}O$ type and contain about 35–40% of unsaponifiable residue whilst fatty oils consist of triglycerides, i.e. of glycerin esters with long chain fatty acids and only have a 1% to 5% unsaponifiable content.

Liquid waxes are highly resistant to oxidation, do not polymerize nor turn rancid. In nature, there exist only two of such waxes: sperm oil and beaked whale wax.

Still more drastic differences as to physical properties and behaviour can be noted between liquid and solid waxes so that solid waxes need not ever be considered.

The amount of liquid wax in the copying element according to the present invention must lie between 10% and 60% of total plasticizer plus vehicle present, varying within this range according to the formula adopted and the utilization characteristics required. It has been found that these liquid waxes, which do not in any way penetrate into the polymeric structure but fill the cells and merely perform the function of vehicle, do not only afford the prime advantage of increasing the regenerative capacity but also induce greater uniformity of spread and, above all, a better dispersion of the dyestuffs. In fact, the formulas using a high percentage of them (30%–50% in the above sense) show a better quality writing.

As oils plasticizing the spongy artificial polymers there can be employed mineral and/or vegetable and/or animal oils, such as vaseline oil, alkylate mineral oils with a viscosity varying from .5 to 25° Engler at 25° C., colza oil, castor oil, neatsfoot oil, rape seed oil, turning oil, linseed oil, oleic alcohol, oleic acid, ricinoleic acid, etc.

The amount of these oils in the composition may vary from .5 to 2.5 parts by weight per part by weight of cellulose ester.

Small quantities of plasticizers of a different kind may also be added, such as dioctyl phthalate, triphenyl phosphate, tricresyl phosphate, etc. which will increase colour intensity of the impression obtained. The quantity of these additive plasticizers varies from 1 to 10% of the total plasticizers.

It must be borne in mind that actually the utilization of one single substance having the two-fold function of plasticizer and vehicle constitutes the greatest disadvantage also for the known self-regenerative carbographic articles where the spongy layer consists of a vinyl polymer. In this case too, the necessity of arriving at a compromise solution between the amount of oil sufficient to guarantee a certain number of regenerations without excessive plasticizing makes it necessary to work under conditions that are not the best for one purpose or work under conditions that are not the best for one purpose or for the other, and which, in particular, do not permit obtaining a self-regeneration as prolonged and therefore such long life as with the articles to which the present invention refers.

On the other hand, it is not possible to carry into effect the present invention with a layer of cellular coating other than cellulose esters, in particular of vinyl polymers since liquid waxes exert on these vinyl polymers a plasticizing action and are miscible and compatible with and soluble in them.

As solvents and diluents for preparing the composition to be applied to the support, there may be utilized all those solvents of cellulose esters and of the plasticizer capable of forming, by evaporation under suitable conditions, a cellular plasticized material of cellulose ester having the required properties. The solvents preferred are ketones such as acetone and methyl ethyl ketone, alcohols such as ethanol and methanol, aromatic solvents such as xylol and toluol.

The procedure for preparing the copying element according to the present invention is as follows:

The dyestuffs and/or pigments are predispersed in the mineral and/or vegetable and/or animal oils and in the liquid waxes and then ground in a three-roller-mill. The paste thus obtained is dispersed in a ball mill with a cellulose ester solution in a suitable solvent as indicated above. The solvent is preferably used at the ratio 2:1 to 4:1 based on the solid components.

This composition is spread on the support, i.e. a sheet, ribbon or such like and the solvent is evaporated.

It has also been found—and this is another object of the present invention—that it is very useful to apply to the support, prior to the coating and transfer layer above described, a substratum of a particular composition principally performing the functions of increasing the longevity of the carbographic articles of the invention and bringing about a more complete anchorage of the cellular layer to the support. Besides these principal advantages, one also achieves greater intensity of the writing as well as an action compensating any irregularities of spread in the upper layer which guarantees absolute uniformity in writing.

It has been found, in order to achieve the above purposes, it is necessary that the substratum should contain only some of the components of the outside layer in well defined and critical proportions.

More precisely the substratum must consist of the same cellulose ester used in the main coating layer, a liquid wax, the ratio of liquid wax to cellulose ester being 10%–35%, dyestuffs and/or pigments, the ratio of dyestuffs and/or pigments to cellulose being also of 10%–35%; and in some cases binding or adhesive agents. The latter, too, in order to have maximum benefit, must be the same as those employed in the upper layer. The substratum is applied by first dispersing the dyestuffs in the liquid waxes and then dispersing the paste thus obtained in a solution in an organic solvent of the polymer; later on, the solvent is eliminated under suitable time and temperature conditions. It is to be noted that the cellulose layer formed in this case, as to structure and consistency, differs from the upper layer, having a different composition as regards the number of components as well as with regard to relative ratios. It has, above all, smaller and stiffer cells. It is just this very difference of structure that is essential with a view to obtaining the above mentioned advantages.

We also found that another critical aspect resides in the thickness of the substratum which must be kept within 3 to 5 g./m.$^2$. In fact, with lower thicknesses, there results poor adhesion to the cellular layer of the support, whilst higher thicknesses impair the sensitivity of the article.

Within the above ratios, the composition of the substratum which one means to prepare must be chosen according to requirements, i.e. according to the use for which it is intended and to the properties required in the finished product, bearing in mind that an increase of the cellulose ester increases the power of adhesion whilst an increase of the amount of vehicle increases the longevity of the article.

It is obvious that to the above mentioned components essential to the transfer compositions according to the present invention any other modifying substance may be added whose usefulness is known to the technician in the art, such as e.g. emulsifiers, fillers, thinners, bonding agents, etc.

In sum, the new self-regenerative carbographic articles to which the present invention refers, have the advantage over the best products so far known of much longer life, about two or three times as long depending upon the article prepared.

This is due chiefly to the above amply elucidated fact that a sponge forming material is used and a vehicle totally or substantially immiscible with it, so that a large quantity of transfer composition can be used without causing the cellular layer to be plasticized to an inadmissible extent, which would make the article unusable.

Moreover, since the liquid waxes we use are far less sensitive to temperature variations than any mineral or vegetable oil, the articles produced according to the present invention are inalterable and prefectly utilizable in any climatic conditions, more so than any analogous article so far known.

Over and above the advantages set forth which mark a considerable progress in this area, the above described articles show all the best features of the articles at present on the market.

We shall now, for purely informative and illustrative purposes, give some instances of coating and transfer compositions according to the invention. Technicians conversant with the subject will easily discern the variations to be made in the compositions according to whether a fluid or a pasty coating is to be obtained and according to the particular use to which the copying element one means to prepare is to be put.

EXAMPLE 1

| | Parts by weight |
|---|---|
| Basic resin cellulose (acetobutyrate 171/2) | 10 |
| Mineral and/or vegetable oils | 9 |
| Dioctyl phtalate plasticizer | 1 |
| Tensioactive agent | 1 |
| Pigments and dyes | 7 |
| Liquid sperm wax | 8 |
| Acetone | 100 |

EXAMPLE 2

| | |
|---|---|
| Basic resin, cellulose acetate | 5 |
| Basic resin, cellulose butyrate, 1/10 sec. | 5 |
| Mineral and/or vegetable oils | 10 |
| Triphenyl phosphate plasticizer | 1.5 |
| Pigments and dyes | 8 |
| Liquid sperm wax | 5 |
| Acetone | 100 |

EXAMPLE 3

| | |
|---|---|
| Basic resin, cellulose butyrate, 1/10 sec. | 20 |
| Cationic emulsifier | 2 |
| Mineral and/or vegetable oils | 10 |
| Pigments and reflux blues | 7 |
| Additives | 10 |
| Liquid sperm wax | 5 |
| Acetone | 200 |

EXAMPLE 4

Black composition for typewriters. The values given for the individual components are parts by weight:

| | |
|---|---|
| Cellulose acetobutyrate 171-2 | 150 |
| Sperm oil | 30 |
| Ricinoleic acid | 30 |
| Blown colza oil | 30 |
| Oleic acid | 5 |
| Reflex blues / Alcaline blues | 45 |
| Carbon black | 30 |
| Acetone / Methyl ethyl ketone | 400 |

This composition, processed as described in the text, is the one most widely used for application on a polypropylene or polyester ribbon (25–20μ thick) yielding a typewriter ribbon lasting 1,000 strokes per linear meter. If one prepares the same ribbon interposing between the support film and the coating and transfer composition a substratum having the following composition:

| | |
|---|---|
| Cellulose butyrate acetate 171/2 | 7 |
| Carbon black | 1 |
| Sperm oil | 1 |
| Acetone | 40 |
| Bonding and adhesive agent | 1 | having a thickness of 5 g./m.$^2$, a typewriter ribbon lasting 10,000 strokes per linear meter is obtained.

EXAMPLE 5

Black composition for carbon paper to be used in typewriters. All parts indicated by weight.

| | |
|---|---|
| Cellulose butyrate acetate 171/2 | 50 |
| Sperm oil | 55 |
| Ricinoleic oil | 20 |
| Blown colza oil | 20 |
| Reflex blues / Alcaline blues | 45 |
| Carbon black | 35 |
| Acetone / Methyl ethyl ketone | 400 |

This composition processed as described in the text, is applied to a thin film (12.5–20μ thick) of polyester, yielding a sheet of carbon paper for typewriters supplying 80–100 copies.

Such a sheet, however, after about 48 to 60 strokes shows the coating layer beginning to peel off. If between the support and the coating layer a 4 g./m.$^2$ substratum of the following composition is interposed:

| | |
|---|---|
| Cellulose butyrate acetate 171/2 | 3 |
| Carbon black | 1 |
| Sperm oil | 1 |
| Acetone | 12 |
| Bonding agent | .5 | one obtains a sheet lasting for 150 strokes without any tendency of the thin coating to detach before complete exhaustion.

EXAMPLE 6

Blue composition for preparing hand tracing sheets:

| | |
|---|---|
| Cellulose butyrate acetate, 1/10 sec. | 34 |
| Cellulose butyrate acetate, 1/2 sec. | 34 |
| Sperm oil | 45 |
| Blown castor oil | 40 |
| Mineral oil viscosity, 6° Englar | 50 |
| Reflex blues | 80 |
| Alcaline blues | 10 |
| Prussian blue | 30 |
| Oleic acid | 30 |
| Acetone | 500 |

The composition prepared as described in the text is suitably applied to a 12.5μ polyester or 15μ polypropylene film. A hand tracing sheet of the duration of 130 strokes is obtained.

If between the support and the coating layer a substratum of the following composition is interposed:

| | |
|---|---|
| Cellulose butyrate acetate 171/2 | 3 |
| Sperm oil | 1 |
| Blue pigments | 1 |
| Acetone | 10 | having a thickness of 3 g./m.² a hand tracing sheet is obtained lasting for 180–200 strokes without the inked layer showing any sign of detaching or sealing.

What is claimed is:

1. Self-regenerative carbographic articles comprising a support having adhered thereto a coating layer comprising a cellular structure of at least one cellulose ester selected from the group consisting of cellulose butyrate, cellulose propionate, cellulose propionate acetate, cellulose butyrate acetate and cellulose propionate butyrate acetate, at least one plasticizer for said cellulose ester selected from the group consisting of a mineral oil, a vegetable oil and an animal oil in an amount from 0.5 to 2.5 parts by weight per part by weight of cellulose ester, a dyestuff or pigment and a liquid wax as a vehicle for the dyestuff which is substantially immiscible in said cellulose ester and is present in an amount of 10–60% by weight based on the total weight of the plasticizer and liquid wax.

2. An article according to claim 1 in which said plasticizer also includes at least one compound selected from the group consisting of di-octyl phthalate, triphenyl phosphate, tricresyl phosphate, in an amount ranging from 1 to 10% by weight of total plasticizer.

3. Self-regenerative carbographic articles comprising a support having adhered thereto a coating layer comprising a cellular structure of at least one cellulose ester selected from the group consisting of cellulose butyrate, cellulose propionate, cellulose propionate acetate, cellulose butyrate acetate and cellulose propionate butyrate acetate, at least one plasticizer for said cellulose ester selected from the group consisting of a mineral oil, a vegetable oil and an animal oil in an amount from 0.5 to 2.5 parts by weight per part by weight of cellulose ester, a dyestuff or pigment and a liquid wax as a vehicle for the dyestuff which is substantially immiscible in said cellulose ester and is present in an amount of 10–60% by weight based on the total weight of the plasticizer and liquid wax, there being disposed between said support and coating layer a cellular substratum consisting essentially of at least one cellulose ester as defined above, at least one coloring agent and at least one liquid wax in an amount from 10 to 35% by weight based on the weight of the cellulose ester.

4. An article according to claim 3 in which said plasticizer also includes at least one compound selected from the group consisting of di-octyl phthalate, triphenyl phosphate, tricresyl phosphate, in an amount ranging from 1 to 10% by weight of total plasticizer.

5. A process for preparing a self-regenerative carbographic article comprising applying to a substratum on a support a composition containing at least one cellulose ester selected from the group consisting of cellulose butyrate, cellulose propionate, cellulose propionate acetate, cellulose butyrate acetate and cellulose propionate butyrate acetate, at least one plasticizer therefor selected from the group consisting of mineral oil, vegetable oil and animal oil in an amount of 0.5 to 2.5 parts by weight per part by weight of cellulose ester, at least one coloring agent, and a liquid wax substantially immiscible in said cellulose ester which acts as a vehicle for the coloring agent in the amount of 10–60% based on the total weight of the plasticizer and liquid wax, all of the above being in a solvent therefor and evaporating the solvent to leave linked to the substratum a cellular layer of said cellulose esters in which cells there is contained the liquid wax carrying said coloring agent, and prior to said coating process applying to the support said substratum comprising a composition consisting essentially of an organic solvent at least one cellulose ester as defined above, a liquid wax and a coloring agent, the liquid wax and the coloring agent being present in the substratum in an amount of from 10–35% by weight of the cellulose ester in said substratum and thereafter evaporating the solvent to form said substratum.

References Cited

UNITED STATES PATENTS

| | | | |
|---|---|---|---|
| 2,970,926 | 2/1961 | Findlay | 117—36.1 |
| 3,034,918 | 5/1962 | Cook et al. | 117—36.4 |
| 3,054,692 | 9/1962 | Newman et al. | 117—36.1 |
| 3,117,018 | 1/1964 | Strauss | 117—36.1 |
| 3,305,382 | 2/1967 | Orinik | 117—36.4 |
| 3,314,814 | 4/1967 | Newman | 117—36.1 |

FOREIGN PATENTS

| | | |
|---|---|---|
| 392,220 | 5/1933 | Great Britain. |

MURRAY KATZ, Primary Examiner

U.S. Cl. X.R.

117—36.1, 138.8, 157; 106—25, 27, 31, 171, 201